Patented July 19, 1932

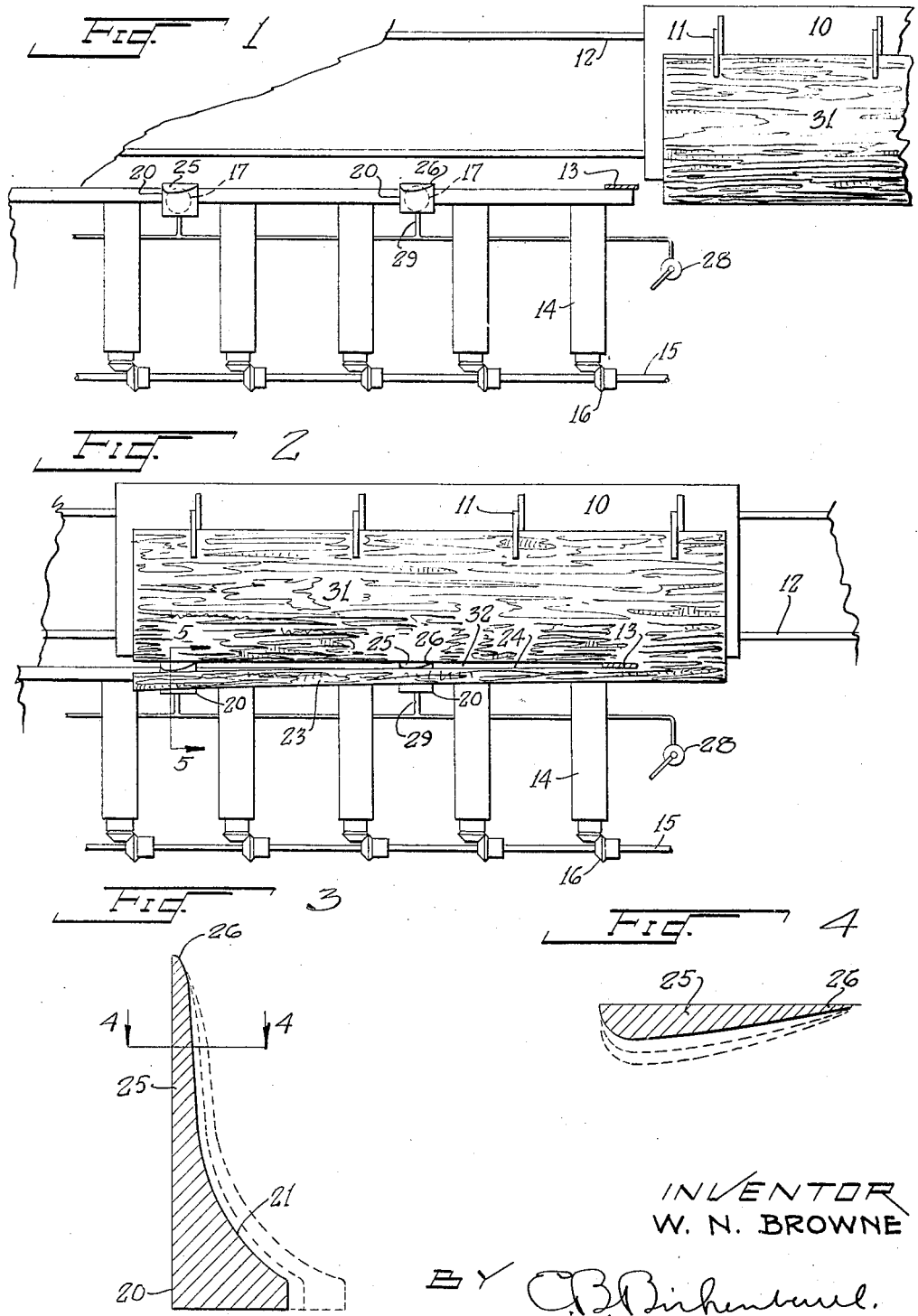

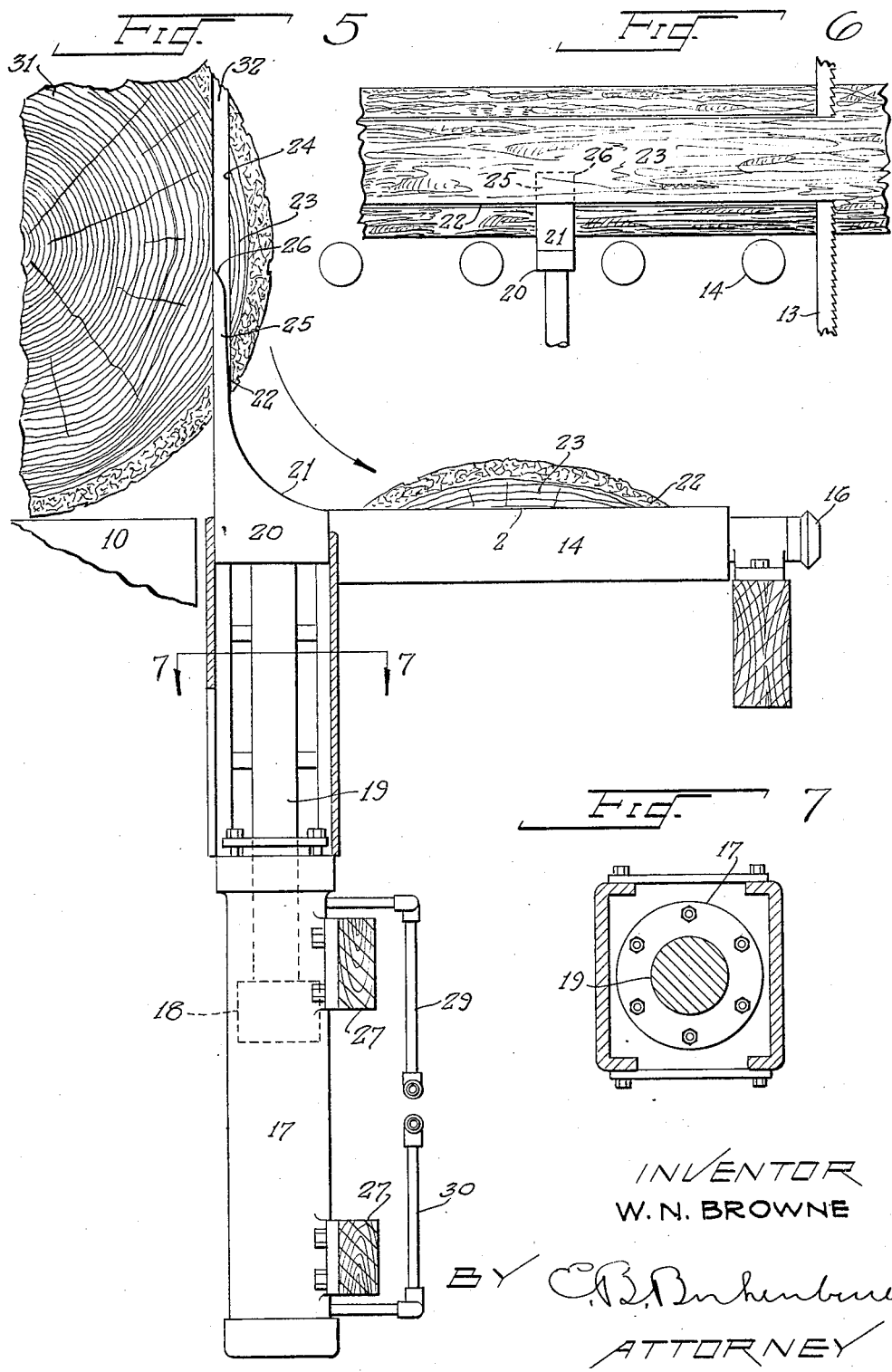

1,867,873

UNITED STATES PATENT OFFICE

WILLIAM N. BROWNE, OF PORT ANGELES, WASHINGTON

MECHANICAL OFF-BEARER

Application filed November 18, 1930. Serial No. 496,421.

This invention relates generally to the lumber industry, and particularly to a device for turning the slabs or edgings sawn from a log in a manner that they will fall upon the conveyor rolls with the flat side down.

The main object of this invention is to provide a mechanical offbearer which will automatically turn a slab with its flat face down as it is cut from the log without any manual labor, thereby eliminating the cost of such labor and the dangers attending this operation.

The second object is to provide a form of offbearer which will be capable of being moved out of the way.

These, and other objects, will become more apparent from the specification following as illustrated in the accompanying drawings, in which:

Fig. 1 is a plan of the device showing the saw cut away in horizontal section.

Fig. 2 is a view similar to Fig. 1 showing the slab being cut from the log.

Fig. 3 is a vertical section through one of the shoes.

Fig. 4 is a horizontal section along the line 4—4 in Fig. 3.

Fig. 5 is a vertical section along the line 5—5 in Fig. 2.

Fig. 6 is an elevation showing the relation of the shoes to the live rolls, as well as the saw log and slab.

Fig. 7 is a horizontal section along the line 7—7 in Fig. 5.

Similar numbers of reference refer to similar parts throughout the several views.

Before entering into a description of this invention it will be understood that it is commonly the practice when the outer slabs are cut from a saw log for a pair of men to turn the slab flat side down as it separates from the log. This not only requires the labor of two men, but also endangers their life and limb. In my device this labor and danger is entirely eliminated, the slabs being turned automatically as they are severed from the log.

Referring in detail to the drawings, there is shown a saw carriage 10 provided with the usual dogs 11. The carriage 10 is moved along the rails 12 by means of the usual propelling mechanism (not shown). There is also illustrated the position of the band saw 13 and offbearer rolls 14 which are driven from the shaft 15 through the gears 16.

Turning now to my invention same will be seen to consist of a plurality of upright cylinders 17 each of which is provided with a piston 18 to which is connected a rod 19 upon whose upper end is mounted a special shaped shoe 20. The various shoes 20 (there being one above each cylinder 17) are almost identical in shape but differ slightly in size, decreasing in dimensions toward the saw 13. The lower part of each shoe 20 is provided with a rounded surface 21 along which the bottom edge 22 of the slab 23 slides onto the rolls 14, bringing the face 24 into contact with the rolls. The uppermost portion 25 of each shoe 20 is really a wedge having its pointed edge 26 facing the saw 13.

The cylinder 17 is secured stationary to the supports 27 and the shoes 20 are raised or lowered by an application valve 28 which controls the flow of air through the pipes 29 and 30 communicating to the opposite ends of the cylinder 17.

The operation of the device is as follows: The log 31 is placed on the carriage 10 and secured by means of the dogs 11 in the usual manner and the carriage moved toward the saw 13. When the saw 13 has formed a cut of sufficient length the first shoe 20, or rather its uppermost portion 25, enters the cut 32 springing the lower edge 22 of the slab 23 outwardly. This action is increased as the successive shoes enter the cut 32 (as shown in Fig. 2) so that by the time the slab is entirely severed from the log its lower end springs outwardly along the curved incline 21 depositing the slab on the offbearer rolls 14. The carriage is now moved back to the point of beginning and the log moved laterally on the carriage or turned thereon, depending upon the nature of the cut to be taken.

When finally, however, there remains on the carriage only a square timber, or one which is partially square, and which it is desired to remove from the carriage, then it will be necessary for the operator to lower all of the shoes 20 by a suitable operation of the valve 28; after which the shoes 20 are again raised to their normal position.

From the foregoing it can be seen that the sawing operation has not been interfered with in any way and no manual effort has been required to turn each slab bark side up on the offbearer rolls 14, thereby not only effecting a saving in labor but eliminating a very dangerous saw mill operation.

While in the drawings I have shown an operating cylinder for each shoe it will of course be understood that the various shoes may be operatively connected and operated from one or more cylinders, depending upon the requirements in the particular instance. When a number of shoes are operated from one cylinder it would be desirable to employ a rock shaft actuated by the cylinder with separate arms for operating the various shoes, all of which is so well understood by the ordinary mechanic as to render further explanation unnecessary.

I claim:

A mechanical offbearer comprising a set of live rolls in combination with means for turning a slab bark side up as it separates from the saw log and placing same on the rolls said means consisting of a plurality of wedges mounted alongside of said rolls in the path of the saw cut each of said wedges having its side nearest to said rolls curved tangentially to the top side of said rolls.

WILLIAM N. BROWNE.